United States Patent
Uehara et al.

(10) Patent No.: US 6,804,420 B2
(45) Date of Patent: Oct. 12, 2004

(54) INFORMATION RETRIEVING SYSTEM AND METHOD

(75) Inventors: Yusuke Uehara, Kawasaki (JP); Daiki Masumoto, Kawasaki (JP); Naoki Sashida, Kawasaki (JP); Shuichi Shiitani, Kawasaki (JP); Susumu Endo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 585 days.

(21) Appl. No.: 09/956,935

(22) Filed: Sep. 21, 2001

(65) Prior Publication Data

US 2002/0164078 A1 Nov. 7, 2002

(30) Foreign Application Priority Data

Mar. 23, 2001 (JP) ........................................ 2001-085759

(51) Int. Cl.[7] ................................................ G06K 9/54
(52) U.S. Cl. ...................... 382/305; 382/190; 382/209; 382/278; 358/403; 707/3; 345/968
(58) Field of Search ................................. 382/190, 209, 382/218, 219, 278, 282, 305; 358/403, 453; 707/3, 6; 345/968

(56) References Cited

U.S. PATENT DOCUMENTS

| | | | | | |
|---|---|---|---|---|---|
| 5,751,286 A | * | 5/1998 | Barber et al. | ................ | 345/835 |
| 5,802,361 A | * | 9/1998 | Wang et al. | ................. | 382/217 |
| 5,983,237 A | * | 11/1999 | Jain et al. | ................. | 707/104.1 |
| 6,084,595 A | * | 7/2000 | Bach et al. | .................. | 345/589 |
| 6,625,321 B1 | * | 9/2003 | Li et al. | ...................... | 382/239 |
| 6,744,935 B2 | * | 6/2004 | Choi et al. | ................... | 382/305 |

FOREIGN PATENT DOCUMENTS

| JP | 11-238078 | 8/1999 |
|---|---|---|
| JP | 2000-29885 | 1/2000 |
| JP | 2000-250943 | 9/2000 |

OTHER PUBLICATIONS

Kimoto, Haruo, "An Interactive Image Retrieval System Using a 3–D Search Space and Its Characteristics", IPSJ Journal vol. 41, No. 03–015, Mar. 2000, pp. 638–657.

* cited by examiner

Primary Examiner—Bhavesh M. Mehta
Assistant Examiner—Yosef Kassa
(74) Attorney, Agent, or Firm—Staas & Halsey LLP

(57) ABSTRACT

A plurality of thumbnails to be used as retrieval keys are indicated by a retrieving key indicating section. Respective feature vector of the retrieval keys are extracted by a feature vector extracting section. A retrieval feature vector selecting section selects, among elements of feature vector of each retrieval key, a prescribed number of elements in a distance average ascending order as retrieval feature vector. A retrieving section retrieves information stored in an information storing section by using the retrieval feature vector. An arrangement feature vector selecting section selects, as arrangement feature vector, among elements of feature vector of the retrieval key, the feature vector elements that have not been extracted as the elements of retrieval feature vector. Elements of feature vector selected in a dispersion descending order in the retrieval results are preferable. An arranging section classifies and arranges results of the retrieval by using the arrangement feature vector by the self-organization mapping or the like, and a display section displays a result of the arrangement.

14 Claims, 13 Drawing Sheets

INFORMATION RETRIEVING SYSTEM AND METHOD

BACKGROUND OF THE INVENTION

1. Field of the Invention

The present invention relates generally to an information retrieving system with which the user specifies a plurality of pieces of information that are similar to desired information are indicated as search keys, a retrieving operation is carried out based on the feature of the plurality of selected retrieval keys, and the retrieval results are displayed on a display screen so that information pieces resembling each other are arranged closer to each other, so that the user is allowed to find desired information quickly.

2. Related Background Art

According to a conventional information retrieving system for retrieving desired information from among massive amount of information, a retrieval condition and information as retrieval targets are compared, and the retrieval results are displayed in a list in which they are arranged in a matching degree decrement order. In this case, without an appropriate retrieval condition being given, retrieval results with high precision cannot be obtained. In the case where image information is retrieval targets, for instance, it is difficult for the user to find and specify an appropriate retrieval request, so that many users input vague retrieval conditions. This causes a lot of retrieval results to be obtained, thereby the user have to check a lot of contents of the retrieval results visually for finding the desired information, which requires enormous labor and time.

As a technique of selecting the retrieval keys, JP2000-250943A discloses a technique for making the retrieving operation efficient by arranging pieces of information as retrieval results visually in a virtual three-dimensional space according to feature vector indicative of features of the respective retrieved information pieces. In this technique, one retrieval key selected by the user from information displayed on a display screen is used as a retrieval request. In this case, the retrieval key and information as the retrieval targets are expressed as feature vector, and degrees of resemblance between pieces of information are calculated according to differences between the elements of feature vectors, so that matching degrees are determined. Here, elements of the feature vector are treated equivalently.

Furthermore, JP2000-29885A discloses a technique for improving the efficiency in browsing the information, in which, while two or three elements of feature vector are switched at predetermined timing, information groups are displayed at once in a two-dimensional or three-dimensional space formed by axes according to the selected elements of feature vector.

When the user selects retrieval keys that are similar to the desired information, the user often brings only a part of elements of the feature vector into focus. Therefore, to retrieve information that the user truly requests with high precision, it is necessary to estimate precisely the elements of the feature vector that the user brings into focus, and then, to carry out a retrieving operation with only the elements of feature vector thus attracting the attention of the user. The technique disclosed by JP2000-250943A is unable to select appropriate retrieval keys, since therein the elements of the feature vector are treated equivalently.

Furthermore, in the case where various types of feature vector are used, likewise, it is necessary to carry out a retrieving operation by using only the feature vector that the user brings into focus among others. On the other hand, JP11(1999)-238078A discloses a technique in which, in the case where various types of feature vector are used, differences between feature vectors of similar types among the various types of feature vectors are determined, and elements of a feature vector with smaller differences are used in a retrieving operation. Here, in order to improve the browsability of retrieved results and to improve the efficiency in looking through the same, it is necessary to locate the similar ones among pieces of information more closely, and further, it is preferable that pieces of information are dispersed appropriately over the retrieval result display screen. With higher dispersion, blocks of information having common features tend to be formed, thereby allowing the efficiency in looking through information to be improved. However, according to the technique disclosed by JP11(1999)-238078A, a technique for selecting elements of feature vector used in retrieval is disclosed, whereas nothing is mentioned about a method for selecting elements of feature vector used in arrangement of the retrieval results for showing the retrieval results to the user. In the case where the elements of feature vector used for the retrieval are selected for arrangement, the retrieval results cannot be dispersed appropriately since they resemble the vector values. This problem also occurs to the selection of elements from a feature vector in vector representation in the case where only one feature value is used.

Furthermore, in the aforementioned technique of JP2000-29885A, alternatively, it is attempted to cope with the problem of feature vector selection by switching the elements of feature vector used for the space axes as time elapses in the arrangement display. However, the switching of the feature vector with elapse of time is irrelevant to the user's intention, and there arises a drawback in that the user has to wait until an intended element of feature vector is selected. Therefore, retrieval fit for the user's intention is not necessarily carried out.

SUMMARY OF THE INVENTION

Therefore, to solve the foregoing problems, it is an object of the present invention to generate a retrieval result displaying screen fit for the user's intention of retrieval and to enable efficient retrieval, by, in retrieval, appropriately selecting information to be used in retrieval according to a plurality of retrieval keys selected by the user, executing retrieval using the selected information, and further, in arrangement of the retrieval results, by appropriately selecting information to be used in arrangement according to the selected retrieval keys.

To achieve the foregoing object, an information retrieving system of the present invention includes: a retrieval key indicating section with which a user indicates a plurality of retrieval keys; a feature vector extracting section for extracting elements of feature vector that correspond to the retrieval keys, respectively; a retrieval feature vector selecting section that compares feature vector elements and calculates averages of distances between corresponding feature vector elements, and selects a prescribed number of feature vector elements in a distance average ascending order as retrieval feature vector to be used in retrieval; a retrieving section that retrieves information stored in an information storing section by using the retrieval feature vector as retrieval executing keys; an arrangement feature vector selecting section that selects the elements of the feature vector that have not been extracted as the retrieval feature vector as arrangement feature vector among the elements of the feature vector vector of each retrieval result; an arranging section that classifies and arranges results of the retrieval by using the arrangement feature vector as features of the arrangement; and a display section that displays a result of the arrangement.

With the foregoing configuration, since only the feature vector elements that the user brings into focus, among the elements of feature vector, are used in retrieval, retrieval with high precision fit for the user's intention is enabled. Further, since the feature vector elements other than the feature vector element used in the retrieval are used in arrangement of the retrieval results, the retrieval results can be dispersed appropriately, whereby the retrieval results can be displayed in an arrangement excelling in browsability.

It should be noted that the arrangement feature vector selecting section selects, as arrangement feature vector, a prescribed number of feature vector elements in a dispersion descending order in the retrieval results, whereby the retrieval results can be displayed in an arrangement excelling in browsability.

Furthermore, in the indication of retrieval keys, it is preferable that in the indication of the retrieval keys, the user arranges the indicated retrieval keys on a plane, and that the retrieval feature vector selecting section selects, as the retrieval feature vector, a prescribed number of feature vector elements of the retrieval keys having ratios therebetween that are the more approximate to a ratio of relative distances between the retrieval keys arranged on the plane.

The foregoing configuration allows resemblance relationships between the plurality of retrieval keys to be reflected in retrieval or arrangement, thereby allowing the elements of feature vector indicated as the retrieval keys to be weighed. Consequently, retrieval with high precision is enabled in the case where the user suggests resemblance relationships between elements of feature vector.

It should be noted that if arrangement positions of information indicated as retrieval keys are allowed to be indicated in the arrangement, the user is allowed to easily grasp the relative relationship between pieces of information on the arrangement display screen, in the case where the user is interested in relationships between individual pieces of information that the user has indicated as the retrieval keys and other pieces of information obtained as retrieval results.

Furthermore, if the so-called walkthrough technique is applied in the arrangement display screen, retrieval results can be browsed readily. Besides, the retrieval key indicating section regards, as a retrieval key selected by the user, a piece of information a distance from which to the viewpoint is in a prescribed value, thereby allowing the retrieval key indication to be carried out speedily.

Furthermore, in the case where in retrieval, among previous retrieving operations, a range of retrieving operations which are to be referred to is indicated and the retrieving operation is executed using the history information, it is possible to limit retrieval targets with trial and error even if sufficient precision cannot be obtained. By doing so, retrieval precision can be improved.

It should be noted that, in the foregoing configuration, the retrieval keys, which the user indicates with the retrieving key indicating section, are thumbnail images, and the feature vector extracting section extracts, as feature vector, image feature vector elements corresponding to original images corresponding to the thumbnail images indicated as the retrieval keys.

This is because, in a retrieving operation, the use of thumbnails makes it possible to obtain superior browsability.

It should be noted that it is possible to provide a processing program code having processing operations with which the information retrieving system is obtained, and the system is constructed with a computer by reading the processing program out of a computer-readable recording medium in which the processing program is recorded.

DETAILED DESCRIPTION OF THE INVENTION

The following description will depict an information retrieving system according to a first embodiment of the present invention.

An information retrieving system according to the first embodiment selects a prescribed number of elements of feature vector as retrieval feature vector, among a plurality of elements of feature vector of retrieval keys, from the viewpoint of smallness of the average of the distance through the plurality of retrieval keys. The information retrieving system, then, retrieves information from an information storing section, utilizing, as retrieval execution keys, the elements of feature vector that have been selected as the elements of retrieval feature vector. In arrangement, the information retrieving system selects arrangement feature vector among the elements of feature vector that have not been utilized as the elements of retrieval feature vector, to carry out an arranging operation. In the present embodiment, thumbnail images are generated from text data or image data, the thumbnail images are classified and arranged as retrieval results, so as to be viewed by the user.

Figure 1:
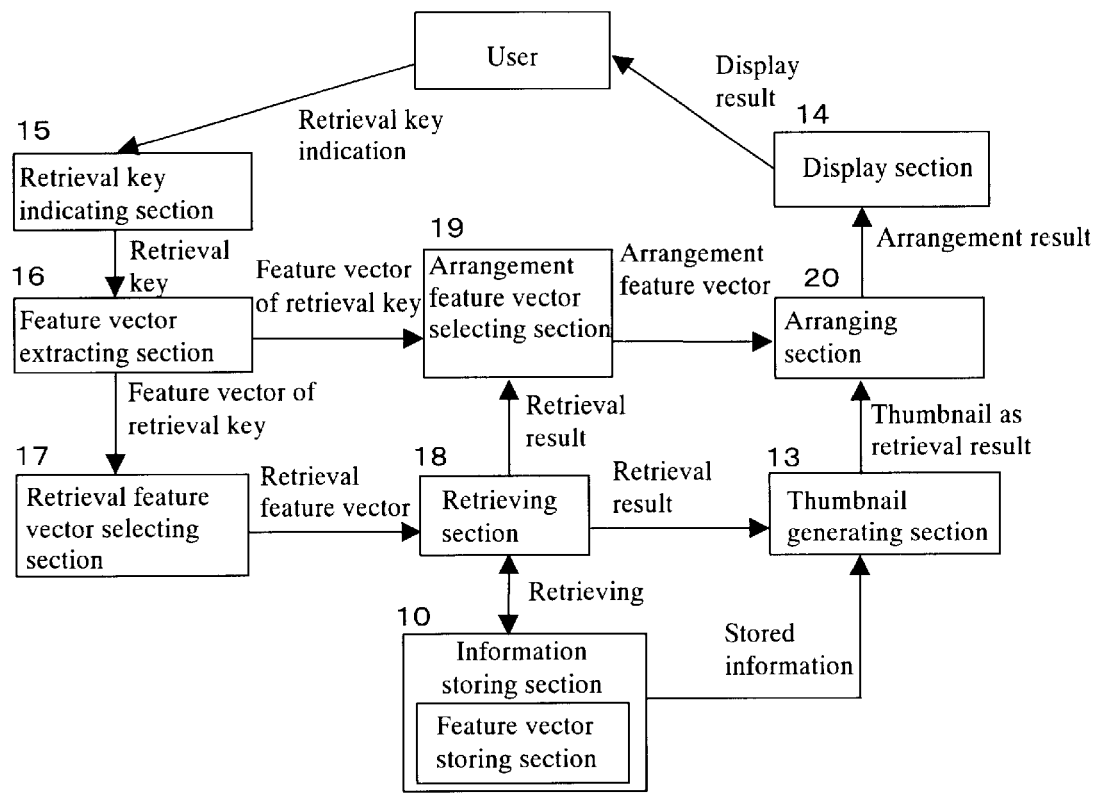
FIG. 1 is a view illustrating an example of a configuration of an information retrieving system according to a first embodiment of the present invention.
Figure 2:
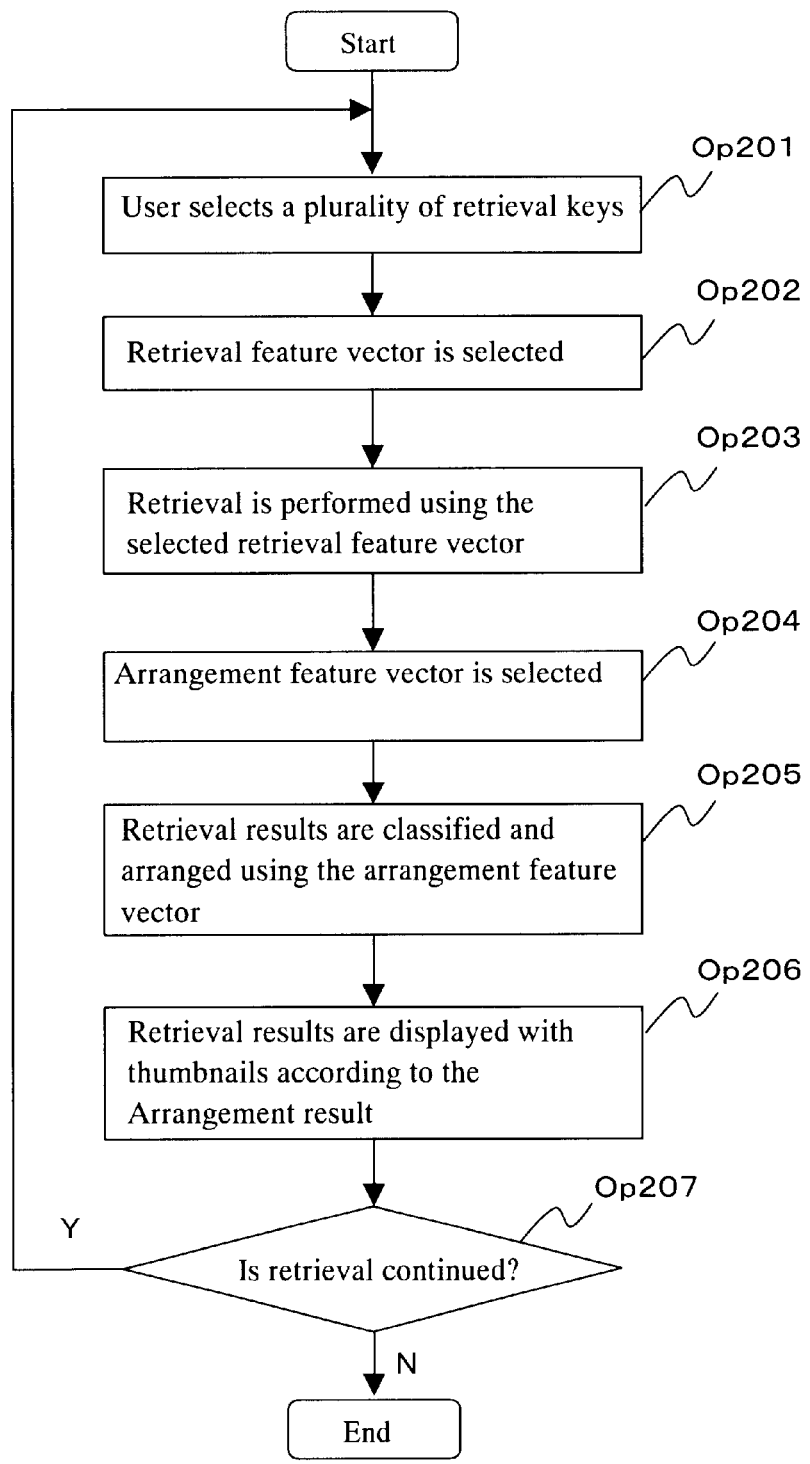
FIG. 2 is a flowchart illustrating a flow of processing performed by the information retrieving system of the present invention.

FIG. 1 is a view illustrating a configuration of an information retrieving system according to the first embodiment.

An information storing section 10 is a part that stores information as targets of retrieval. In the present embodiment, the retrieval target information is text data or image data, and information of the same is stored in the information storing section 10.

A thumbnail generating section 13 is a part that generates thumbnails based on the text data or image data stored in the information storing section 10.

Thumbnails used for displaying data are, for instance, image data per se, or reduced-size images of the same, in the case where the stored data are image data. In the case where the stored data are text data, they are, for instance, titles of books and other documents, or file names. Thumbnails may be the foregoing or anything as long as they are capable of visually representing information that allows contents of data to be recognized.

The display section 14 is a part that displays information as retrieval results that have been classified and arranged. In the present embodiment, the display section 14 is a part that displays thumbnails corresponding to retrieved text data or image data. Further, in the case where thumbnails are used for indication of retrieval keys with a retrieval key indicating section 15, it is possible to use the thumbnails displayed on the display section 14.

The retrieval key indicating section 15 is a part with which the user indicates a plurality of retrieval keys. In the present embodiment, the retrieval keys are thumbnail images, and to indicate the retrieval keys, a plurality of pieces of information similar to desired information are selected from thumbnails displayed on the display section 14. The retrieval key indicating section 15 provides the user with a means for indicating thumbnails among those displayed on the display section 14.

A feature vector extracting section 16 is a part for extracting elements of feature vector that are associated with retrieval keys indicated by the retrieval key indicating section 15. In the present embodiment, it extracts a value of a feature vector that indicates a content of text data or image information corresponding to a thumbnail that the user has selected as an indicated retrieval key.

Examples of the feature vector include, in the case of image data, a color histogram that represents a proportion of pixels contained in each block divided into an RGB color space or an HSV color space, and a color space distribution in which average colors in respective blocks that are obtained by dividing an image into matrix are arrayed. In the case of text data, the feature vector could be a frequency distribution of contained words. Any matters including these may be used as elements of feature vector as long as they are vector elements indicative of features of data.

The retrieval feature vector selecting section 17 is a part that, as to a plurality of retrieval keys indicated via the retrieval key indicating section 15, compares respective averages of distances between corresponding elements of retrieval keys and selects a prescribed number of the feature vector elements in a distance average ascending order so as to use the same elements as retrieval feature vector in a retrieving operation. The retrieval feature vector selecting section 17 compares corresponding feature vector elements of a plurality of retrieval key images so as to calculate average distances, and selects a prescribed number of feature vector elements in a distance average ascending order so as to use the same elements as retrieval feature vector.

The retrieving section 18 searches the information storing section 10, using the retrieval feature vector selected by the retrieval feature vector selecting section 17. In the present embodiment, only the feature vector elements selected as the retrieval feature vector are brought into focus, to be compared with corresponding feature vector elements of text data or image data stored in the information storing section 10, so that a prescribed number of text data or image data are retrieved in an ascending order of the differences from the retrieval feature vector, as retrieval results from the information storing section 10.

The arrangement feature vector selecting section 19 brings into focus the feature vector elements other than those selected as the retrieval feature vector by the retrieval feature vector selecting section 17, and among the same, selects a prescribed number of feature vector elements in a dispersion descending order in the retrieving result, as arrangement feature vector. In the present embodiment, only the feature vector elements that are not selected as the retrieval feature vector are brought into focus, and a prescribed number of feature vector elements in a dispersion descending order in the text data or image data as a result of the retrieval are selected as elements of arrangement feature vector.

An arranging section 20 arranges pieces of information retrieved by the retrieving section 18 on a plane based on only the arrangement feature vector so that pieces of information having smaller differences are placed more closely, and displays the results with thumbnails generated by the thumbnail generating section 13, using the display section 14.

The following description will depict a flow of a processing operation by the information retrieving system, while referring to flowcharts of FIGS. 2 to 7.

Prior to the processing operation, values that are quantified as vector values are extracted from all the text data or image data stored in the information storing section 10, and are stored. Besides, prior to the processing operation, thumbnails are generated by the thumbnail generating section 13, based on the text data or image data stored in the information storing section 10.

Figure 3:
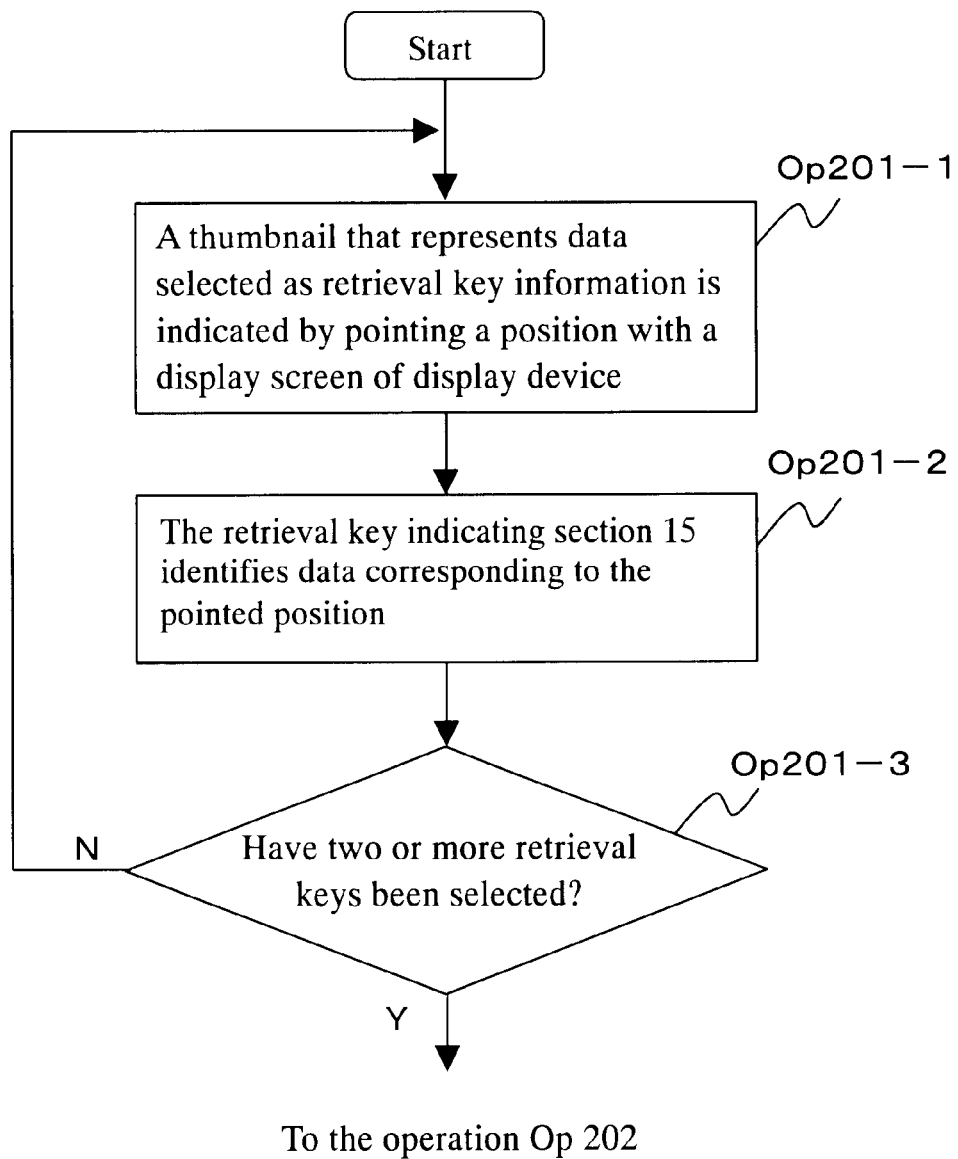
FIG. 3 is a flowchart illustrating details of an operation 201 shown in FIG. 2.

First of all, the user selects a plurality of retrieval keys (Operation 201). The details of Operation 201 are shown in the flowchart of FIG. 3.

In the present embodiment, data to be selected as retrieval keys are indicated by pointing positions on the screen on which thumbnails are displayed by the display section 14. As a method for pointing a position on the screen of the display section 14, for instance, a method of using a mouse as an operation input device in which a position of a cursor when the mouse is clicked is regarded as the indicated position is applicable. Thus, thumbnails indicative of data to be selected as retrieval key information are indicated by pointing their positions on the display screen of the display device (Operation 201-1).

The retrieval key indicating section 15 identifies corresponding data according to the indicated positions (Operation 201-2). When the user provides an instruction for ending the retrieval key selecting operation to the retrieval key indicating section 15 after selecting two or more retrieval keys, the retrieval key selecting operation is ended (Operation 201-3).

Figure 8:
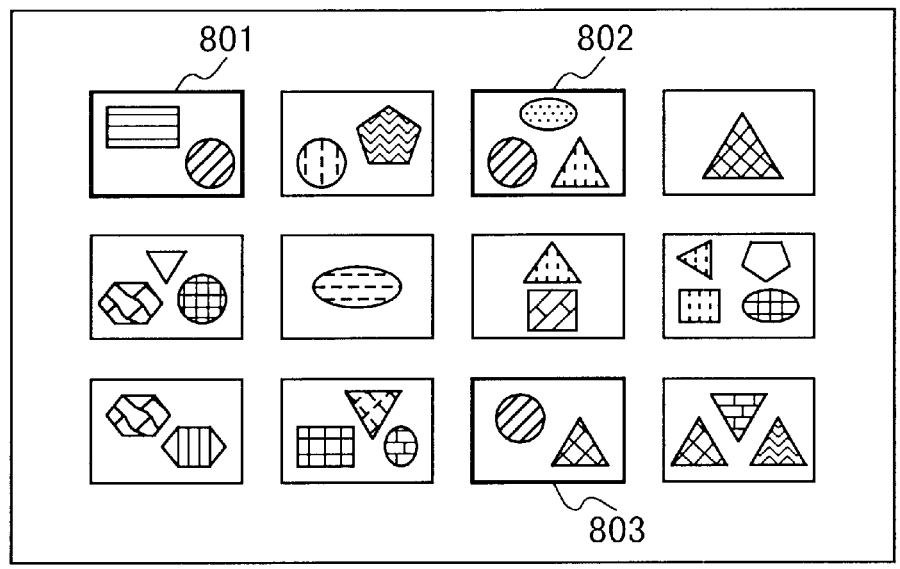
FIG. 8 is a view schematically illustrating an example of a display screen shown on a display section 14.

FIG. 8 is a view schematically illustrating an example of a display screen on the display device 14. A plurality of thumbnails are displayed as shown in FIG. 8, and the user indicates thumbnails to be used as retrieval keys, with a pointing device or the like. In the present embodiment, three thumbnails 801, 802, and 803 are indicated as retrieval keys.

Figure 4:
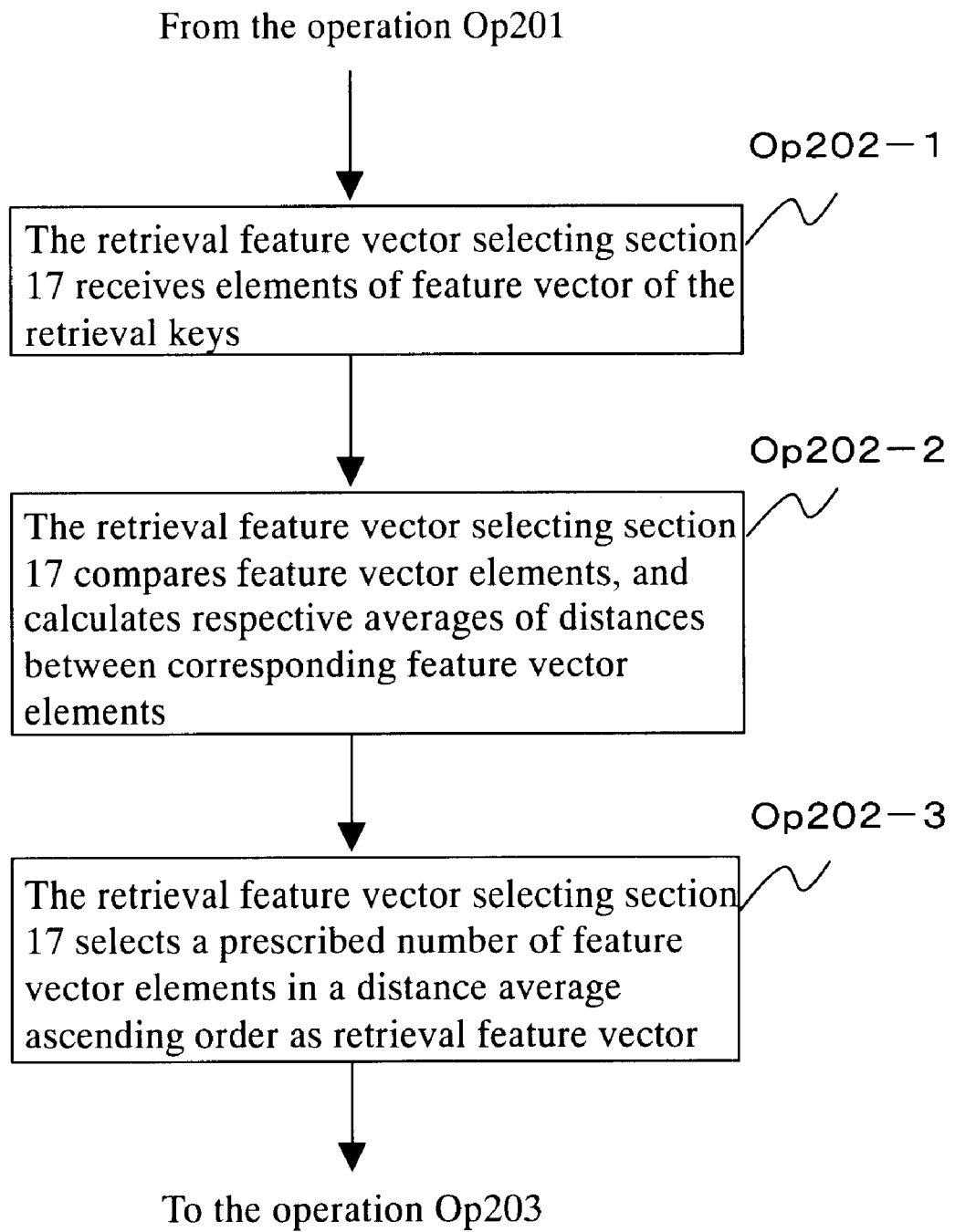
FIG. 4 is a flowchart illustrating details of an operation 202 shown in FIG. 2.

Next, elements of retrieval feature vector are selected (Operation 202). The details of the operation 202 are shown in the flowchart of FIG. 4.

First of all, the retrieval feature vector selecting section 17 receives elements of feature vector of text data or image data selected as retrieval keys, which have been extracted by the feature vector extracting section 16 (Operation 202-1). Since the elements of feature vector have been extracted from all the text data or image data stored in the information storing section 10 prior to the processing operation and have been stored, the elements of feature vector are taken out of the thus stored feature vector elements.

Subsequently, with respect to the feature vector elements thus taken out, the retrieval feature vector selecting section 17 calculates respective averages of differences between corresponding feature vector elements (Operation 202-2). The retrieval feature vector selecting section 17 carries out a selecting operation with respect to the feature vector elements thus taken out so that only a prescribed number of feature vector elements are selected in a distance average ascending order and remain in the feature vector.

For instance, the number of vector elements of a feature vector is assumed to be N, and concerning the feature vector elements in the plurality of data selected as retrieval keys, averages of differences between corresponding elements of feature vector are calculated, respectively, and feature vector elements having the smallest to m'th smallest difference averages are determined.

For instance, assume that information 1 indicated as a retrieval key has a feature vector of $(D_1(1), D_2(1), D_3(1), D_4(1), D_5(1))$, information 2 indicated as a retrieval key has a feature vector of $(D_1(2), D_2(2), D_3(2), D_4(2), D_5(2))$, and information 3 indicated as the retrieval key has a feature vector of $(D_1(3), D_2(3), D_3(3), D_4(3), D_5(3))$. Corresponding elements of the feature vector of the information 1 to 3 are compared, and average distances are determined as to each element. For instance, the each average distance may be determined as an average of absolute values of differences between corresponding element values, according to an expression 1 below:

$$(|D_i(1)-D_i(2)|+|D_i(2)-D_i(3)|+|D_i(3)-D_i(1)|)/3 \quad \text{[Expression 1]}$$

where i=1, . . . , 5.

Here, in the case where the prescribed number "m" as the number of elements to be selected as vector elements of the retrieval feature vector is "2", two feature vector elements having the smallest and second smallest average distances, respectively, among those determined by the expression 1 are selected. For instance, the elements $D_1$ and $D_5$ are selected. In other words, $(D_1(1)$ and $D_5(1))$ are selected as the retrieval feature vector from the information 1, $(D_1(2)$ and $D_5(2))$ are selected as the retrieval feature vector from the information 2, and $(D_1(3)$ and $D_5(3))$ are selected as the retrieval feature vector from the information 3.

Figure 5:
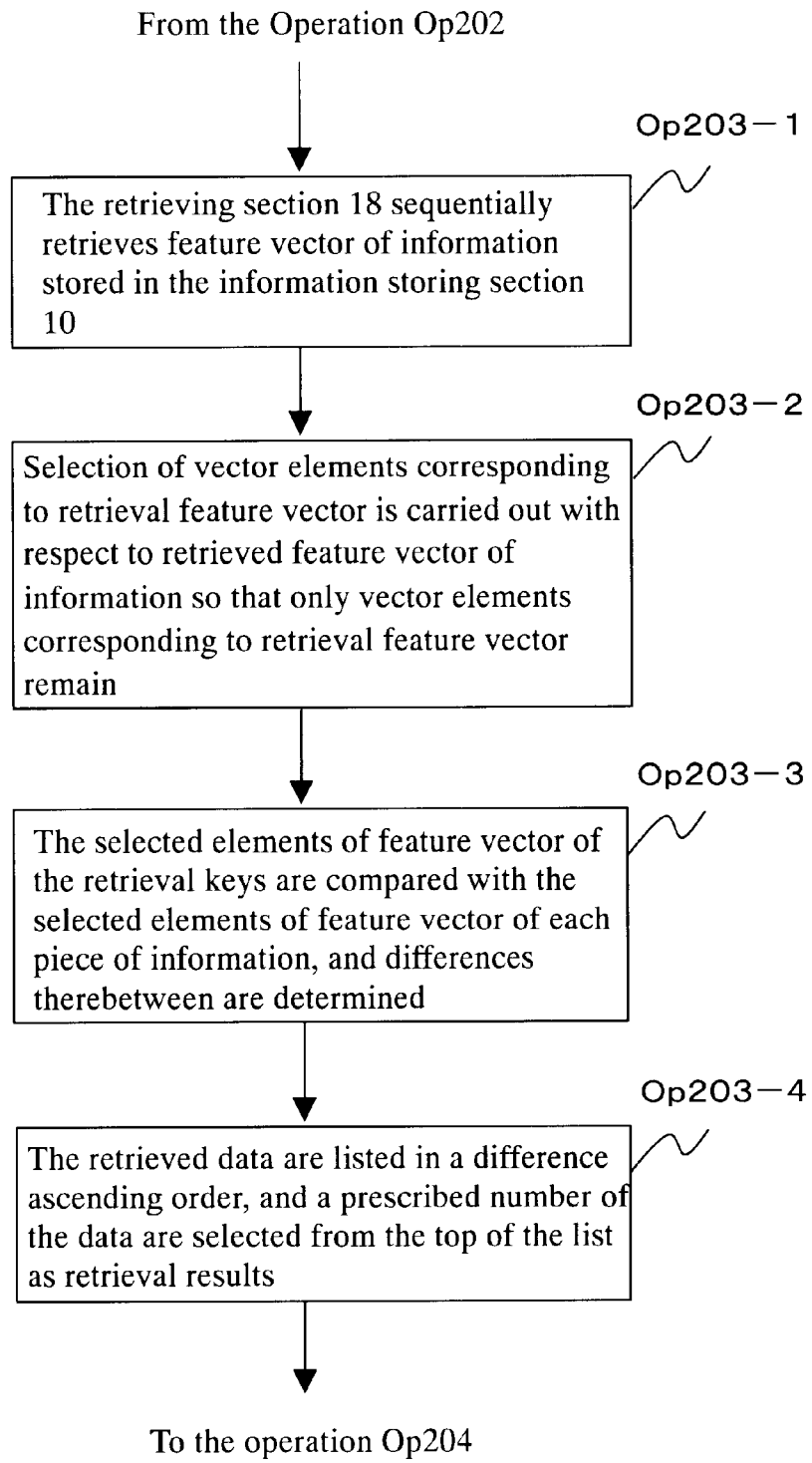
FIG. 5 is a flowchart illustrating details of an operation 203 shown in FIG. 2.

Next, the retrieval is executed using the retrieval feature vector selected by the retrieving section 18 (Operation 203). The details of the operation 203 are shown in the flowchart of FIG. 5

The retrieving section 18 sequentially takes out the feature vector of the text data or image data stored in the information storing section 10 (Operation S203-1). The retrieving section 18 carries out a selecting operation with respect to the feature vector elements thus taken out so that only vector elements corresponding to the vector elements selected as the retrieval feature vector remain in the feature vector elements (Operation 203-2). Then, it collates the selected feature vector elements of the data taken out of the information storing section 10 with the selected feature vector elements of the retrieval keys, and differences therebetween are calculated as Euclidean distances, so that differences are determined as to each of the retrieval keys (Operation 203-3). Then, as to all the stored data in the information storing section 10, respective averages of differences from the retrieval keys are determined, and the data are listed in the average difference decrement order, so that a prescribed number of data from the top of the list are obtained as retrieval results (Operation 203-4).

Figure 9:
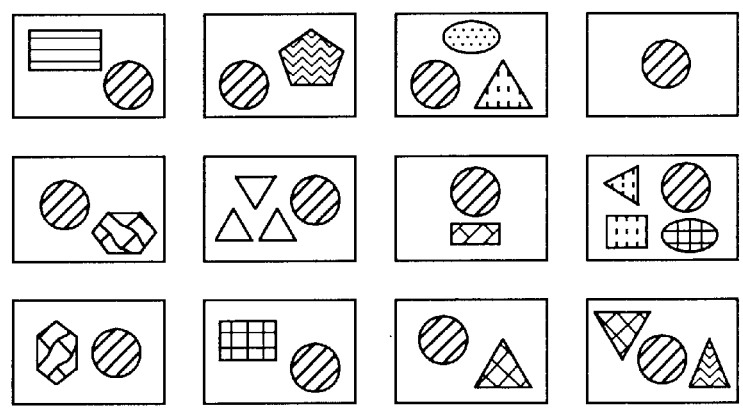
FIG. 9 is a view schematically illustrating results of retrieval based on the retrieval feature vector selected with three retrieval keys shown in FIG. 8.

FIG. 9 is a view schematically illustrating an example of results of the retrieval based on the retrieval feature vector selected according to the three retrieval keys shown in FIG. 8.

Figure 6:
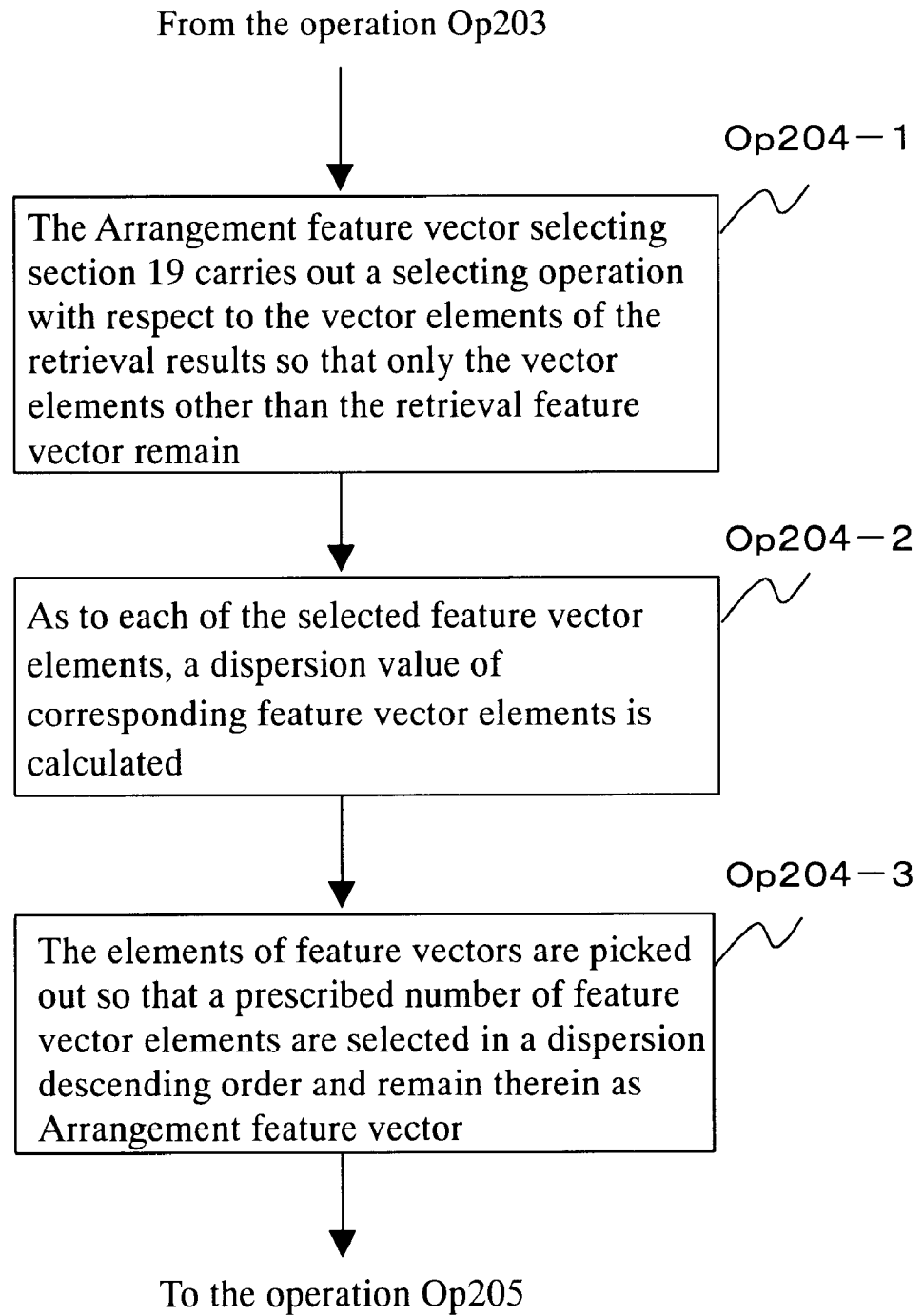
FIG. 6 is a flowchart illustrating details of an operation 204 shown in FIG. 2.

Next, arrangement feature vector elements are selected by the arrangement feature vector selecting section 19 (204). The details of the operation 204 are shown in the flowchart of FIG. 6.

The arrangement feature vector selecting section 19 carries out a selecting operation with respect to vector elements of the retrieval results so that only elements other than the elements selected upon the retrieval remain in the feature vector elements (Operation 204-1). Here, since $D_1(n)$ and $D_5(n)$ have been selected as the retrieval feature vector elements, $D_2(n)$, $D_3(n)$, and $D_4(n)$ remain.

Subsequently, as to the feature vector elements thus selected, calculation of dispersion values is carried out with respect to corresponding feature vector elements (Operation 204-2). The feature vector elements are picked out so that a prescribed number of feature vector elements are selected in a dispersion descending order and remain therein as arrangement feature vector (Operation 204-3). For instance, assume that the prescribed number is "2", and $(D_2(n)$ and $D_3(n))$ are selected as arrangement feature vector elements.

Figure 7:
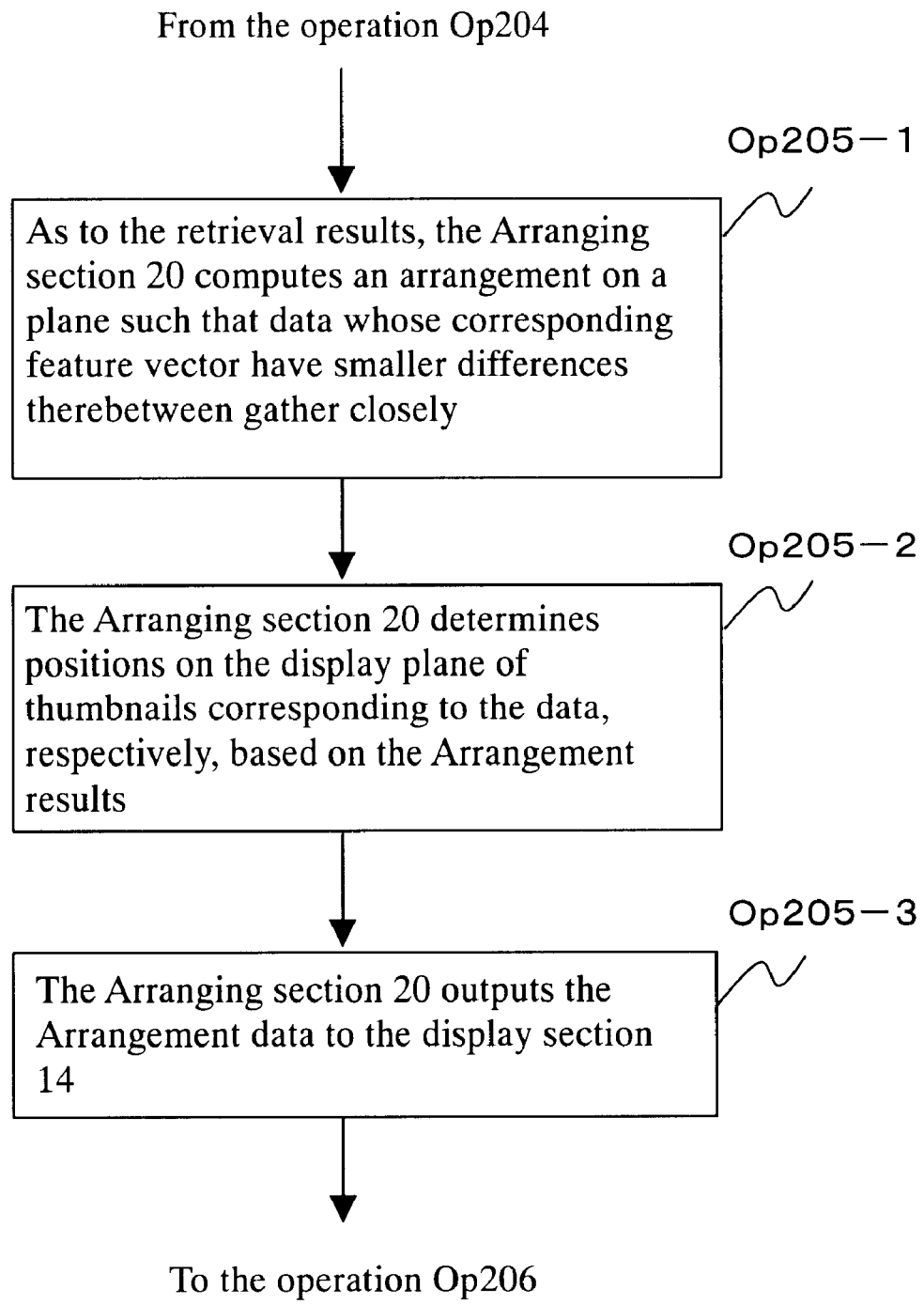
FIG. 7 is a flowchart illustrating details of an operation 205 shown in FIG. 2.

Next, the arranging section 20 classifies and arranges the retrieval results, using the arrangement feature vector (Operation 205). The details of the operation 205 are shown in the flowchart of FIG. 7. As to the retrieval results, the arranging section 20 computes an arrangement on a plane such that data whose corresponding feature vector have smaller differences therebetween gather closely (Operation 205-1). The arranging section 20 determines positions on the display plane of thumbnails corresponding to the data, respectively, that are generated by the thumbnail generating section 13 based on the arrangement results (Operation 205-2). For instance, as a method for computing an arrangement on a plane so as to allow those having smaller differences between feature vectors to be placed more closely, the self-organization mapping, the multi-dimensional scale arranging, etc. are applicable.

The arranging section 20 outputs the arrangement data to the display section 14 (Operation 205-3).

Subsequently, the display section 14 displays the retrieval results in the thumbnail representation based on the arrangement results (Operation 206).

Figure 10:
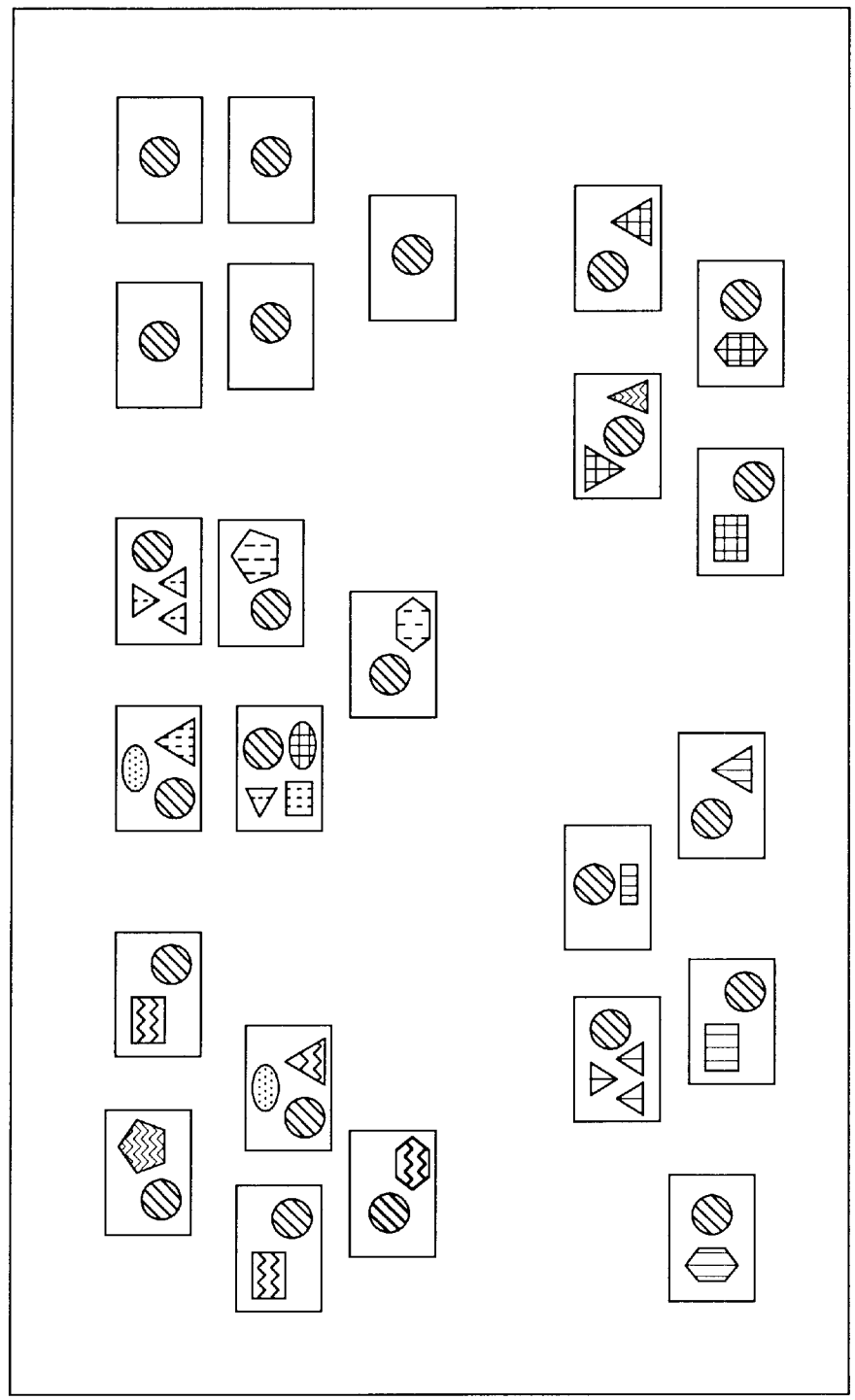
FIG. 10 is a diagram illustrating a result of arrangement of retrieval results obtained as shown in FIG. 9 by the self-organization mapping, using arrangement feature vector as features of arrangement.

FIG. 10 is a diagram illustrating a display obtained by arranging the retrieval results obtained as shown in FIG. 9 by the self-organization mapping using the arrangement feature vector as features in arrangement. It can be seen from the diagram that those containing the same image element 901 and further resembling each other as to presence/absence of other image elements are arranged closely.

Thus, the information arranging operation is carried out through the operations 201 to 206.

Here, it is possible to repeat the operations 201 to 206, and the retrieval feature vector selecting section 17 and the arrangement feature vector selecting section 19 herein may maintain the history of the retrieval keys the user has selected, so that information on the previous feature vector selection can be utilized in the feature vector selecting process. In other words, among the previous information retrieving operations, a range of those that are to be referred to are indicated, and the retrieval feature vector selecting section 17 is, in the selection of the retrieval feature vector, allowed to select elements of retrieval feature vector also from the information that has been used in the previous retrieving operations thus indicated for reference, and the arrangement feature vector selecting section 19 selects elements of arrangement feature vector to be used as the features in arrangement, also from the elements of arrangement feature vector that have been used as features in arrangement in the previous retrieving operations thus indicated for reference.

Furthermore, the display section 14 may have a function of displaying the arranged retrieval results in a state of being viewed from an arbitrary viewpoint in a virtual three-dimensional space, and a function of accepting a change of the viewpoint by the user so as to enable walkthrough processing in a virtual three-dimensional space. Furthermore, herein it is possible to allow the retrieval key indicating section 15 to regard an operation of moving the viewpoint with respect to a certain thumbnail in a prescribed distance therefrom in the display space as a retrieval key selecting operation. Furthermore, it is possible to allow the retrieval key indicating section 15 to regard the moving of the viewpoint through a thumbnail display position toward the bottom of the display screen as a retrieval key selecting operation, thereby leading to anew repetition of the process of the operations 201 to 206.

As described above, with the information retrieving system according to the first embodiment, retrieval with high precision fit for the user's intention is enabled by utilizing only elements that the user bring into focus, among elements of feature vector in a retrieving operation. Besides, since in arranging the retrieval results, only elements with higher dispersion are used among feature vector elements from which the elements used in retrieval are excluded, speedy display with arrangement excelling in browsability is obtained. As a result, it is possible to search massive information efficiently.

Second Embodiment

An information retrieving device according to a second embodiment is as follows. In the indication of the retrieval keys, the user places the indicated retrieval keys on a plane. Then, a relative ratio of distances between the retrieval keys on the foregoing arrangement plane is determined, and the retrieval feature vector selecting section selects a prescribed number of elements of feature vecto of the retrieval keys having value ratios therebetween that are the more approximate to the relative distance ratio between the retrieval keys, so that feature vector having the foregoing elements are selected as the retrieval feature vector.

Figure 11:
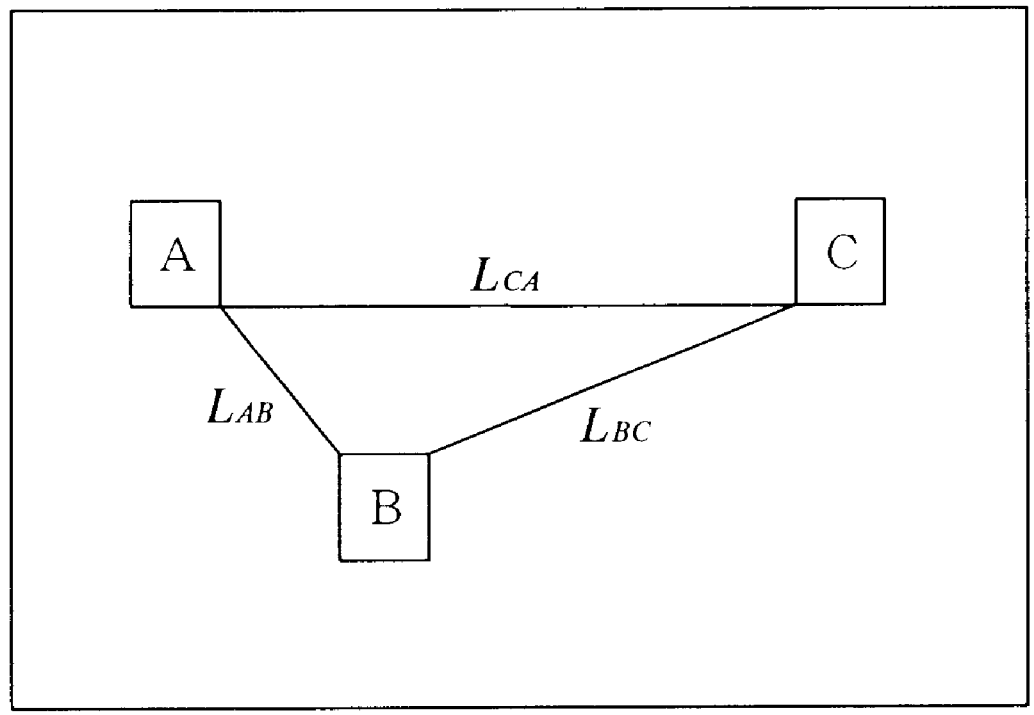
FIG. 11 is a view schematically illustrating an example of arrangement of three retrieval keys A, B, and C.
Figure 12:
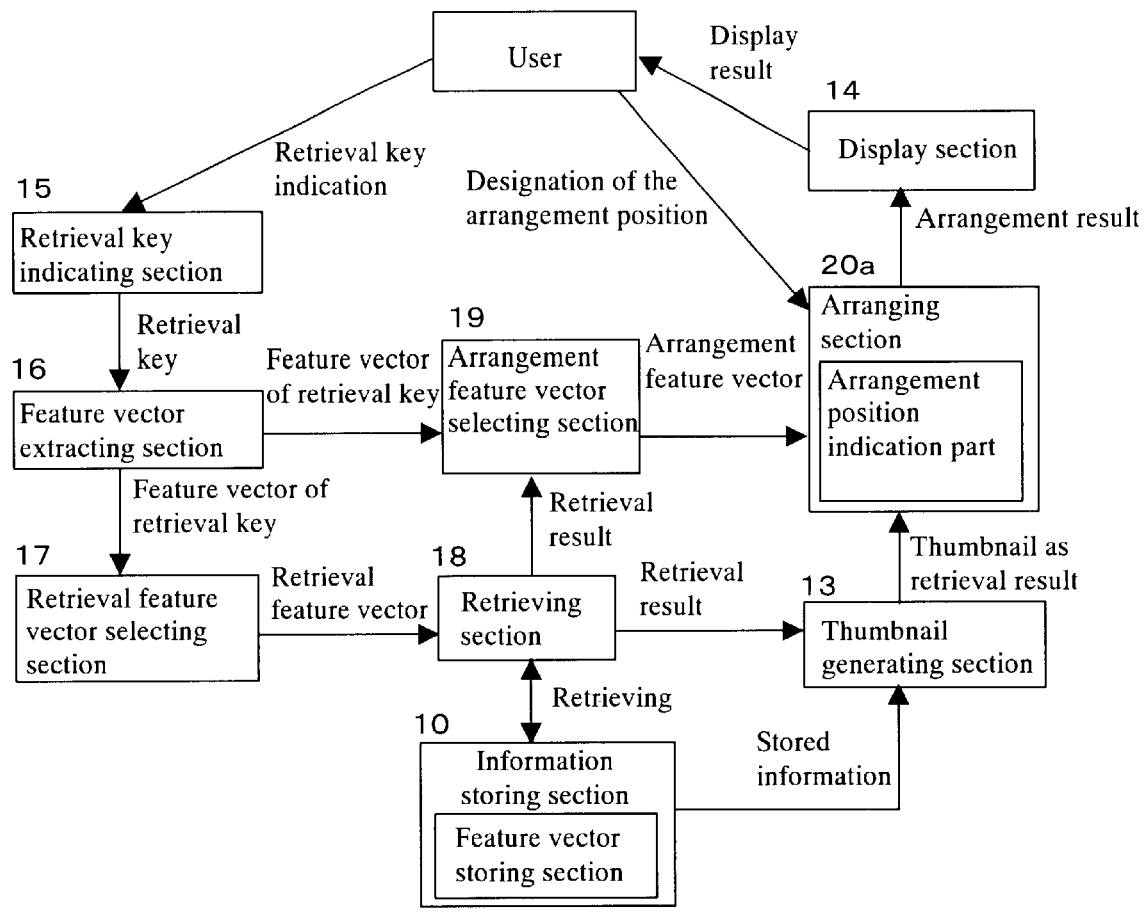
FIG. 12 is a view illustrating an example of a configuration of an information retrieving system according to a third embodiment of the present invention.

In the present embodiment, assume that after selecting a plurality of retrieval keys with the retrieval key indicating section 15, the user is allowed to indicate resemblance relationships between the retrieval keys by placing thumbnails corresponding to the selected retrieval keys at arbitrary positions on a display plane of the display section 14. FIG. 11 illustrates an example of arrangement of three retrieval keys A, B, and C. In the present embodiment, the user indicates resemblance relationships such that the retrieval keys A and B are close to each other, while the retrieval keys A and C are not close to each other, and the retrieval keys C and B, neither.

In the selection of the feature vector elements to be used as the retrieval feature vector or the selection of kinds of feature vector to be used as the retrieval feature vector, the retrieval feature vector selecting section 17 first of all determines elements such that averages of differences between corresponding feature vectors are within a prescribed value range, and then, determines ratios of differences between the corresponding elements. Among the elements thus determined, a prescribed number of elements having the difference ratios closer to the difference ratio of thumbnails arranged by the user on the screen are selected. For instance, as shown in FIG. 11, distances between the retrieval keys A and B, between the retrieval keys B and C, and between the retrieval keys C and A, arranged by the user on the screen, are shown as $L_{AB}$, $L_{BC}$, and $L_{CA}$. Further, a difference between the i'th element of a feature vector of the retrieval key A and the i'th element of a feature vector of the retrieval key B, a difference between the i'th element of a feature vector of the retrieval key B and the i'th element of a feature vector the retrieval key C, and a difference between the i'th element of a feature vector of the retrieval key C and the i'th element of a feature vector of the retrieval key A, are given as $li_{AB}$, $li_{BC}$, and $li_{CA}$, respectively. Then, an evaluation value Ei about the i'th elements is calculated by an expression 2 below:

$$Ei = \left| \frac{L_{BC}}{L_{AB}} - \frac{li_{BC}}{li_{AB}} \right| + \left| \frac{L_{CA}}{L_{AB}} - \frac{li_{CA}}{li_{AB}} \right| \qquad \text{[Expression 2]}$$

The retrieving operation performed by the retrieving section 18 after the retrieval feature vector selecting operation, the arrangement operation performed by the arranging section 20, the display operation performed by the display section 14, and the like may be the same as those in the first embodiment.

As described above, the information retrieving system according to the second embodiment allows the resemblance relationship between a plurality of retrieval keys to be reflected in the selection of the elements of retrieval feature vector, thereby substantially weighing the elements of feature vector of the retrieval key by arranging the retrieval keys. By this processing, with the resemblance relationships between the retrieval keys reflected in the retrieving operation according to the user's intention, a retrieving operation can be carried out with high precision.

Third Embodiment

An information retrieving system according a third embodiment includes an arrangement position indicating section that indicates an arrangement position of information indicated as the retrieval key. Therefore, in the arrangement, an arrangement position of the information used as the retrieval key is displayed in an indicated position according to an instruction of the arrangement position indicating section.

If arrangement positions of information indicated as retrieval keys are allowed to be indicated in the arrangement, the user is allowed to easily grasp the relative relationship between pieces of information on the arrangement display screen, in the case where the user is interested in relationships between individual pieces of information that the user has indicated as the retrieval keys and other pieces of information obtained as retrieval results.

An arranging section 20a includes an arrangement position indicating section 21. Among the data selected as the retrieval keys, the user indicates retrieval keys whose arrangement positions the user likes to fix, and further, indicates display positions of the same on the display device 14, with the arrangement position indicating section 21. As to the timing of indication of the retrieval keys and their display positions, the indication is carried out at, for instance, the timing of the indication of the retrieval keys via the retrieval key indicating section 15.

After the retrieving operation by the retrieving section 18, the arranging section 20 classifies and arranges pieces of information obtained as retrieval results according to arrangement feature vector. Herein, pieces of information whose arrangement positions are fixedly indicated are fixed to the arrangement positions, and the other pieces of information are classified and arranged by the self-organization mapping or the like.

Figure 13:
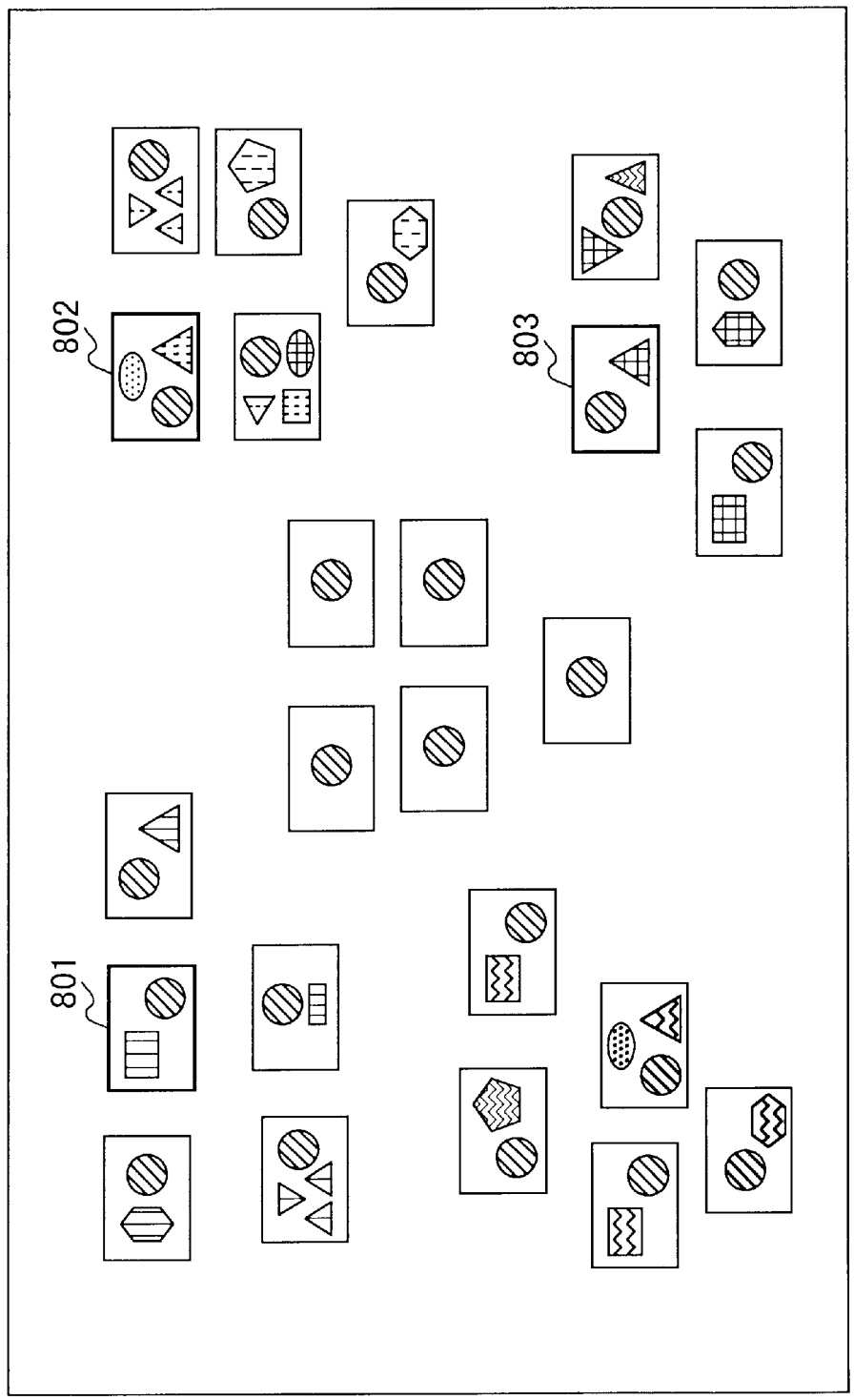
FIG. 13 is a view illustrating a result of arrangement in the case where indication is made.

For instance, the following description will depict an example that is combined with the system explained in the description of the second embodiment, that is, the system in which the retrieval keys are arranged on a plane so that element of feature vector of the retrieval keys are weighed. The user arranges three retrieval keys A, B, and C as shown in FIG. 11, and further, indicates the arrangement positions of the retrieval keys A, B, and C fixedly at the relative positions shown in FIG. 11, with the arrangement position indicating section 21. FIG. 13 is a view illustrating a result of the arrangement in the case where such an indication is made. The thumbnails of the retrieval keys A, B, and C are fixed at the relative positions shown in FIG. 11, and the other thumbnails are classified and arranged by the self-organization mapping.

Fourth Embodiment

Figure 14:
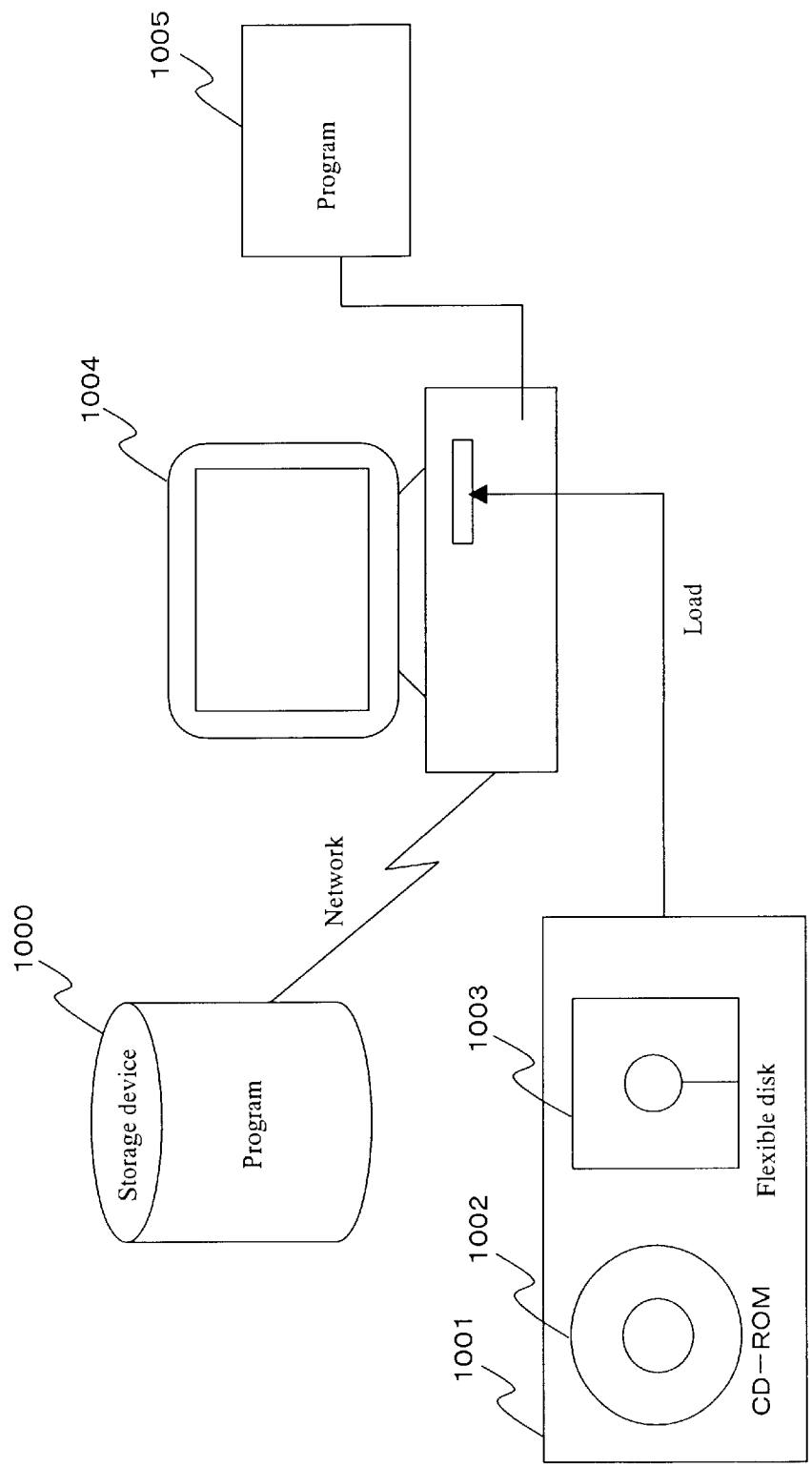
FIG. 14 is a view illustrating a recording medium that stores a processing program for providing a user interface system according to a fourth embodiment of the present invention.

By recording the program that details the operations for realizing the configuration described above into a computer-readable recording medium and providing the same, a user interface system of the present invention can be configured using a variety of computers. A recording medium that stores a program having the processing operations for realizing a user interface system of the present invention may be, as shown with examples of recording media in FIG. 14, not only a portable recording medium 1001, for instance, a CD-ROM 1002 or a flexible disk 1003, but also may be a recording medium 1000 in a recording device on a network, or a recording medium 1005 such as a hard disk of a computer or a RAM, and upon execution of the program, the program is loaded on a computer 1004 and executed on a main memory.

With the foregoing configuration, since only the feature vector elements that the user brings into focus, among the elements of feature vector, are used in retrieval, retrieval with high precision fit for the user's intention is enabled. Further, since the feature vector elements other than the feature vector element used in the retrieval are used in arrangement of the retrieval results, the retrieval results can be dispersed appropriately, whereby the retrieval results can be displayed in an arrangement excelling in browsability.

With the foregoing configuration, since only the feature vector elements that the user brings into focus, among the elements of feature vector, are used in retrieval, retrieval with high precision fit for the user's intention is enabled. Further, since the elements of feature vector other than the vector elements used in the retrieval are used in arrangement of the retrieval results, the retrieval results can be dispersed appropriately, whereby the retrieval results can be displayed in an arrangement excelling in browsability. This enables an efficient retrieving operation with respect to massive information.

Furthermore, since, among the elements of arrangement feature vector, kinds of feature vector elements with high dispersion in the retrieval results are selected and used in arrangement, the retrieval results can be displayed in an arrangement excelling in browsability.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An information retrieving system comprising:
    a retrieval key indicating section with which a user indicates a plurality of retrieval keys;
    a feature vector extracting section for extracting elements of feature vector that correspond to the retrieval keys, respectively;
    a retrieval feature vector selecting section that compares averages of distances between corresponding elements of the feature vector, and selects a prescribed number of elements in an average distance ascending order as retrieval feature vector to be used in retrieval;
    a retrieving section that retrieves information stored in an information storing section by using the retrieval feature vector as retrieval executing keys;
    an arrangement feature vector selecting section that selects the elements of the feature vector that have not been extracted as the elements of retrieval feature vector as the elements of arrangement feature vector among the elements of the feature vectors of each retrieval key;
    an arranging section that classifies and arranges results of the retrieval by using the arrangement feature vector as features of the arrangement; and
    a display section that displays a result of the arrangement.

2. The information retrieving system according to claim 1, wherein:
    the retrieval keys, which the user indicates with the retrieving key indicating section, are thumbnail images; and
    the feature vector extracting section extracts, as feature vector, image feature vector of original images corresponding to the thumbnail images indicated as the retrieval keys.

3. The information retrieving system according to claim 1, wherein the prescribed number of elements selected by the arrangement feature vector selecting section as the arrangement feature vector are those which are selected in a dispersion descending order in the results of the retrieval.

4. The information retrieving system according to claim 3, wherein:
    the retrieval keys, which the user indicates with the retrieving key indicating section, are thumbnail images; and
    the feature vector extracting section extracts, as feature vector, image feature vector of original images corresponding to the thumbnail images indicated as the retrieval keys.

5. The information retrieving system according to claim 1, wherein:
    in the indication of the retrieval keys, the user arranges the indicated retrieval keys on a plane; and the retrieval feature vector selecting section selects, as the retrieval feature vector, a prescribed number of feature vector elements of the retrieval keys having ratios of relative distances therebetween that are the more approximate to a ratio of relative distances between the retrieval keys arranged on the plane.

6. The information retrieving system according to claim 5, wherein:
the retrieval keys, which the user indicates with the retrieving key indicating section, are thumbnail images; and
the feature vector extracting section extracts, as feature vector, image feature vector of original images corresponding to the thumbnail images indicated as the retrieval keys.

7. The information retrieving system according to claim 1, wherein the arranging section includes an arrangement position indicating part that indicates an arrangement position of information indicated as the retrieval key, and in the arrangement of the results of the retrieval, the arrangement position of each piece of information selected as the retrieval key is adjusted as the indicated position, according to control by the arrangement position indicating part.

8. The information retrieving system according to claim 7, wherein:
the retrieval keys, which the user indicates with the retrieving key indicating section, are thumbnail images; and
the feature vector extracting section extracts, as feature vector, image feature vector of original images corresponding to the thumbnail images indicated as the retrieval keys.

9. The information retrieving system according to claim 1, wherein the retrieval feature vector selecting section and the arrangement feature vector selecting section hold history information, and in the case where among the previous information retrieving operations, a range of those that are to be referred to are indicated, the retrieval feature vector selecting section is, in the selection of the retrieval feature vector, allowed to select elements of retrieval feature vector also from the information that has been used in the previous retrieving operations thus indicated for reference, and the arrangement feature vector selecting section is allowed to select elements of arrangement feature vector to be used as the features of the arrangement also from the arrangement feature vector that have been used as features in arrangement in the previous retrieving operations thus indicated for reference.

10. The information retrieving system according to claim 9, wherein:
the retrieval keys, which the user indicates with the retrieving key indicating section, are thumbnail images; and
the feature vector extracting section extracts, as feature vector, image feature vector of original images corresponding to the thumbnail images indicated as the retrieval keys.

11. The information retrieving system according to claim 1, wherein:
the display section has a function of displaying the arranged retrieval results in a state of being viewed from an arbitrary viewpoint in a virtual three-dimensional space, and a function of accepting an operation for a change of the viewpoint by the user so as to enable walkthrough processing in a virtual three-dimensional space; and
the retrieval key indicating section regards, as a retrieval key selected by the user, a piece of information having a distance in a prescribed value from the viewpoint.

12. The information retrieving system according to claim 11, wherein:
the retrieval keys, which the user indicates with the retrieving key indicating section, are thumbnail images; and
the feature vector extracting section extracts, as feature vector, image feature vector of original images corresponding to the thumbnail images indicated as the retrieval keys.

13. An information retrieving method comprising:
allowing a user to indicate a plurality of retrieval keys;
extracting elements of feature vector that correspond to the retrieval keys, respectively;
comparing averages of distances between corresponding elements of the feature vector, and selecting a prescribed number of elements in a distance average ascending order as retrieval feature vector to be used in retrieval;
retrieving information stored in an information storing section by using the retrieval feature vector as retrieval executing keys;
selecting the elements of the feature vector that have not been extracted as the retrieval feature vector as arrangement feature vector among the elements of the feature vector of each retrieval key; and
classifying and arranging results of the retrieval by using the arrangement feature vector as features of the arrangement; and
displaying a result of the arrangement.

14. A program for performing an information retrieving operation, the program comprising program codes for:
a retrieval key indicating operation in which a user indicates a plurality of retrieval keys;
a feature vector extracting operation for extracting elements of feature vector that correspond to the retrieval keys, respectively;
a retrieval feature vector selecting operation for comparing averages of distances between corresponding elements of the feature vector, and selecting a prescribed number of elements in a distance average ascending order as retrieval feature vector to be used in retrieval;
a retrieving operation for retrieving information stored in an information storing section by using the retrieval feature vector as retrieval executing keys;
an arrangement feature vector selecting operation for selecting the elements of the feature vector that have not been extracted as the retrieval feature vector as arrangement feature vector among the elements of the feature vector of each retrieval key;
an arranging operation for arranging results of the retrieval by using the arrangement feature vector as features of the arrangement; and
a display operation for displaying a result of the arrangement.

* * * * *